UNITED STATES PATENT OFFICE.

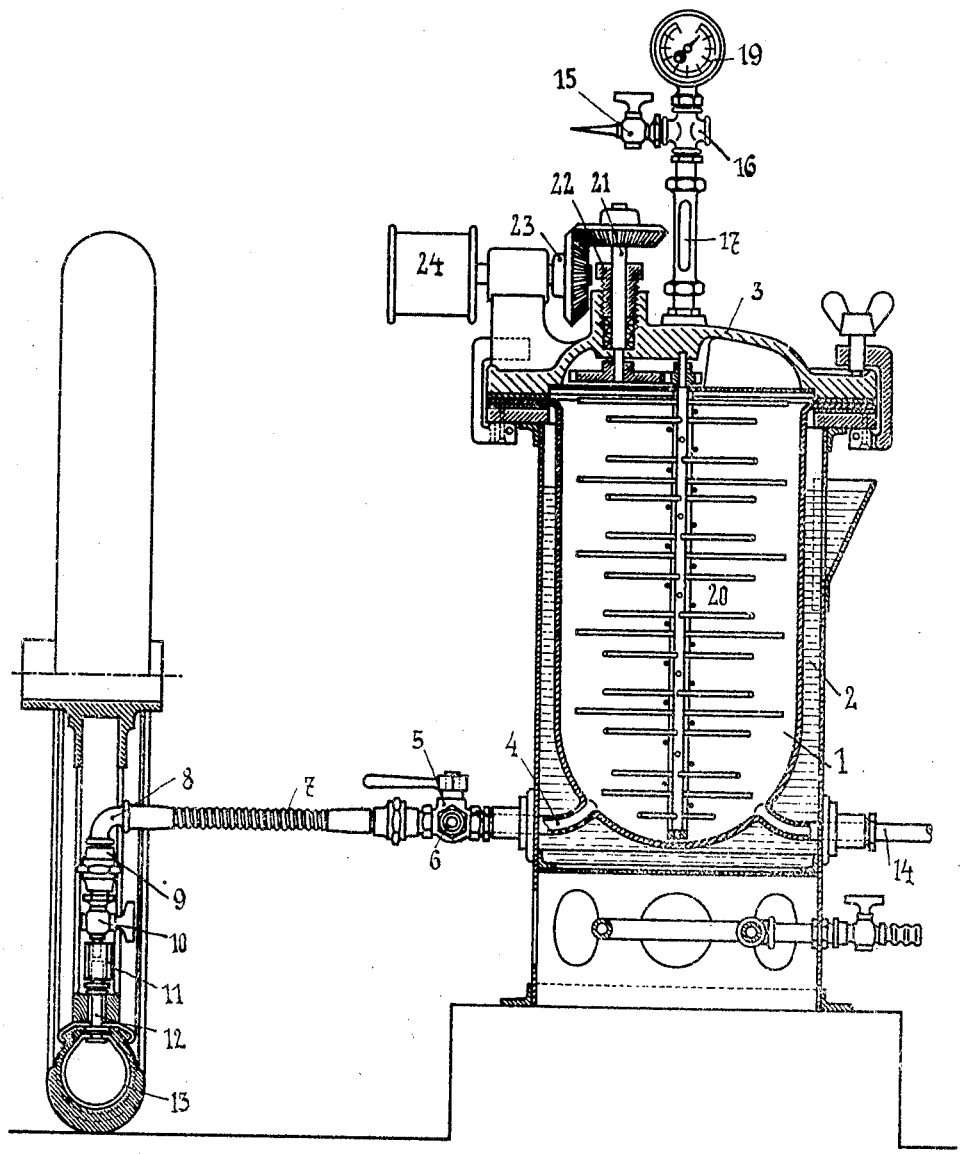

FRITZ PFLEUMER, OF DRESDEN, GERMANY.

PROCESS FOR MANUFACTURING ELASTIC FILLINGS FOR TIRES.

No. 851,960.     Specification of Letters Patent.     Patented April 30, 1907.

Application filed January 27, 1906. Serial No. 298,129.

*To all whom it may concern:*

Be it known that I, FRITZ PFLEUMER, a subject of the Emperor of Austria, residing at Dresden, Germany, have invented certain new and useful Improvements in Processes for Manufacturing Elastic Fillings for Tires, of which the following is a specification.

It has already been proposed (for inst. by Nirdlinger in his U. S. Patent 753,206) to fill the interior of bicycle, automobile or the like tires with cells containing compressed air. For producing such a filling medium, the emulsion, consisting of certain elastic substances, the melting point of which is below that of rubber, is beaten into foam under pressure within a receptacle by suitable means, so that there are produced in the mass bubbles or cells filled with air, whereupon the filling mass is forced under pressure into the tires.

Suitable substances for making such an emulsion are for instance india rubber of various kinds, gelatinous substances, such as vegetable or animal gelatin, animal jelly (glue), bone glue (gelatin), isinglass (fish glue), chondrin, or the like. These may be employed either alone or mingled with each other, or with other substances, such as do not effect the elasticity. When gelatin is used, it must first be steeped in water, glycerin then added and finally the water driven off by boiling, for the purpose of preserving the mass. In carrying out such processes it has been found that the filling material does not possess, in the tire, a degree of elasticity approaching sufficiently near to that of compressed air alone, for the reason that under the proposed conditions the gelatin or the like could not be made of a sufficiently liquid consistency to form thin enough walls for the individual cells, with the result that only a relatively small percentage of air can be incorporated into the filling mass while a large part of the filling material consists of solid gelatin or the like.

My invention has for its object to introduce a greater amount of air into the filling, so that only a relatively small part of the filling consists of gelatin or the like. I obtain this result by beating the heated gelatinous mass within a closed receptacle into a foam under a pressure higher than that which the filling material shall have when about to be introduced into the tire. This excess pressure should be about four or five times that of the pressure within the tire when ready for use, or even more. The filling material thus beaten up under this extra high pressure will then be loosened up, so to speak, by suddenly or gradually reducing the pressure within the receptacle. This pressure reduction may be obtained by blowing off pressure air or gas, with the result that by reason of the ensuing expansion the air bubbles or cells already contained in the mass will be greatly enlarged. To allow of sufficient expansion the receptacle must in the beginning of the operation be only partly filled with the mixture. The filling material is then ready to be introduced into the tire and by reason of the large amount of air contained in it, an elasticity approximately equal to that of compressed air alone will result.

In the accompanying drawing I have illustrated in vertical section a filling apparatus applied to a tire, by means of which my improved process may be carried out.

The filling mass is boiled by being placed in a receptacle 1, which dips into a tank of water 2, heated from below by gas or in any other suitable manner. The receptacle 1 is closed by a cover 3 shut down air-tight by means of gaskets, clamps and wing nuts, or the like. At the bottom of the receptacle is an outlet pipe 4, connected by the fittings 5, 7, 8, 9, 10, 11 with the air tube 13. To fill the tire, the valve plug must first be removed from the tube valve 12 and the fittings 8, 9, 10 screwed on with the aid of the coupling 11. The latter has below a right-handed thread to fit the valve casing, and above a left-handed thread, so that the connection is effected by simply turning the union 11. The union 9 is likewise provided with right and left handed threads, so that by merely turning it, connection is made with the flexible metallic hose 7.

Immediately the mass is ready for filling into the tire, the cover 3 is set upon the receptacle and closed down air-tight by means of the wing nuts. An air pump must then be connected to the outlet 6 of the three-way cock 5 and the air withdrawn from the tube 13. The mass is then converted into foam under increased pressure, which is done in the following manner:—When the necessary pressure has been produced in the receptacle 1 (which pressure, as stated above, should be about four or five times as high as that of the filling material ready for use) by pumping in air through the orifice 16, a gyratory motion is imparted to the mass by beating, and air is thereby introduced into it from above; or the air is pumped into the receptacle from below through a pipe 14 connected with a force pump. The air bubbles ascending in the mass are distributed by means of a mixing device and thoroughly mingled with it. In order that the foam may expand throughout the entire receptacle 1, the excess pressure which is above the foam and which prevents its expansion, must be let out through the outlet 15. 17 is a glass tube through which the rising foam can be observed. 19 is a gage for observing the pressure in the receptacle 1 during the process. The composition may also be converted into foam,—if desired, during the above process—by the addition of some substance evolving gas, such as effervescent powder, baking powder, and the like. The foam in the receptacle can be sampled by connecting the outlet 6 of the three-way cock 5 with the receptacle 1 and screwing a measuring glass or the like to the threaded connection at 9.

The mass is beaten up or mixed with air by means of the stirring apparatus 20, operated by a shaft 21, which passes through an air-tight stuffing box 22 in the cover 3 and is driven by a pulley 24 and bevel gears 23. The beating device 20 is connected direct with the air-tight cover 3 and can be lifted out with it. When the mass has been converted into foam by means of this apparatus, and the excess pressure has been reduced, as above described a force pump is connected at 16, the receptacle 1 brought into connection with the tube 13 by means of the three-way cock 5, air pumped into the receptacle and the foam thus forced through the fittings 5—11 in a still hot, liquid condition into the tube 13. After filling the tube, the cock 10 is closed and the hose 7 disconnected by unscrewing the union 9. After removal of the mass remaining in the hose 7, a new tire can be filled. After the mass in the tube 13 has cooled, the union 11 is disconnected, and the valve 12 closed again in the well known manner.

What I claim is:—

The herein-described improvement in manufacturing tires, consisting in converting a gelatinous mass into a foam under a pressure higher than that required in the tire, augmenting the foaming operation by reducing the pressure from that of the foaming tank to that of the tire, for the purpose of thereby allowing the mass to expand, and then forcing the expanded mass into the tire, substantially as set forth.

In testimony whereof I affix my signature in presence of two witnesses.

FRITZ PFLEUMER.

Witnesses:
PAUL ARRAS,
PAUL E. SCHILLING.